United States Patent [19]
Bronicki et al.

[11] Patent Number: 5,713,195
[45] Date of Patent: Feb. 3, 1998

[54] MULTI-FUEL, COMBINED CYCLE POWER PLANT METHOD AND APPARATUS

[75] Inventors: Lucien Y. Bronicki, Yavne; Joseph Sinai, Ramat Gan; Benjamin Doron, Jerusalem; Uri Kaplan, Moshav Galia, all of Israel

[73] Assignee: Ormat Industries Ltd., Yavne, Israel

[21] Appl. No.: 689,492

[22] Filed: Aug. 7, 1996

Related U.S. Application Data

[63] Continuation of Ser. No. 307,434, Sep. 19, 1994, abandoned.

[51] Int. Cl.$^6$ ............................... F02C 3/28; F02C 6/18
[52] U.S. Cl. .................... 60/39.02; 60/39.12; 60/39.182
[58] Field of Search .......................... 60/39.02, 39.12, 60/39.181, 39.182; 122/4 D

[56] References Cited

U.S. PATENT DOCUMENTS

| | | | |
|---|---|---|---|
| 3,703,052 | 11/1972 | Linden | 48/215 |
| 3,996,863 | 12/1976 | Osborn | 122/4 D |
| 4,369,624 | 1/1983 | Hamm et al. | 60/39.12 |
| 4,387,560 | 6/1983 | Hamilton et al. | 60/39.02 |
| 4,470,255 | 9/1984 | Rowlands et al. | 60/39.12 |
| 4,476,674 | 10/1984 | Berman | 60/39.182 |
| 4,700,639 | 10/1987 | Esterson et al. | 110/347 |
| 5,255,507 | 10/1993 | Gounder | 60/39.12 |

FOREIGN PATENT DOCUMENTS

2076062  11/1981  United Kingdom ............. 60/39.182

OTHER PUBLICATIONS

"Spouted Beds" by Kishan B. Mathur and Norman Epstein, 1974, Academic Press.

*Primary Examiner*—Louis J. Casaregola
*Attorney, Agent, or Firm*—Donald M. Sandler

[57] ABSTRACT

A power plant includes a gas turbine unit having a compressor for compressing ambient air, a burner for burning fuel and heating air compressed by said compressor, and a turbine for expanding air heated by said burner to drive said compressor and produce hot exhaust gases. The plant further includes a combustor for containing particles of solid fuel which are fluidized by the exhaust gases from the turbine to produce hot products of combustion that include coarse ash particulate. Apparatus is provided for generating power from the hot products of combustion.

20 Claims, 4 Drawing Sheets

MULTI-FUEL, COMBINED CYCLE POWER PLANT METHOD AND APPARATUS

This application is a continuation of application Ser. No. 08/307,434, filed Sep. 19, 1994, now abandoned.

TECHNICAL FIELD

This invention relates to a multi-fuel, combined cycle power plant.

BACKGROUND

For many years, large scale gas turbine based stationary power plants fueled by conventional gas or liquid fuels, such as natural gas, liquefied petroleum gas (LPG), etc., have been used by utilities for peaking purposes because of the fast, on-line response of a gas turbine. More recently, combined cycle power plants have been constructed to increase the efficiency of the system. Such power plants include a waste heat boiler that extracts heat from the exhaust gases of the gas turbine for generating steam that drives a steam turbine and produces additional power. Furthermore, sometimes supplementary duct firing has been used as an addition to the waste heat boiler.

At the same time, efforts have been made to utilize less expensive, and more abundant low heat content solid fuels, such as low quality coal, oil shale, bituminous phosphates, etc., in base-line power plants. Conventionally, power plants using such low heat content fuels have employed fluidized bed combustors that include integral heat transfer elements. Such elements are usually rapidly fouled by agglomeration of ash because the solid fuels used contain relatively large amounts of ash, and this complicates heat transfer to the working fluid of the power plant.

It is an object of the present invention to provide a combined cycle power plant operating on low quality solid fuel in which several of the disadvantages outlined are reduced or substantially overcome.

DISCLOSURE OF INVENTION

A power plant according to the present invention includes a gas turbine unit having a compressor for compressing ambient air, a burner for burning fuel under excess air conditions and heating air compressed by the compressor, a generator, and a turbine coupled to a generator for expanding air heated by the burner to drive the compressor and the generator for producing hot exhaust gases and electrical power. The plant further includes a combustor, for supplementary firing, containing particles of solid fuel which are fluidized by the exhaust gases from the turbine and which burn in the combustor to produce hot products of combustion that include coarse ash particulate. Apparatus is provided for generating power from the hot products of combustion.

Preferably, the fluidization of the particles in the combustor is achieved in a spouted bed combustor that includes a separator for extracting coarse ash particulate from the hot products of combustion. In such case, the apparatus for generating power from the hot products of combustion includes a waste heat boiler responsive to the hot products of combustion after the separator extracts coarse ash particulate for producing steam, a steam turbine coupled to a generator for expanding the steam and producing power, and a condenser unit for condensing steam expanded in the steam turbine. A pump may be provided for returning the condensate produced by the condenser to the waste heat boiler.

Separation, and/or precipitation filtering, of much of the ash particulate from the products of combustion before these products are applied to the waste heat boiler significantly reduces fouling of the heat transfer elements in the boiler. Moreover, under these conditions, a spouted bed combustor is advantageous over a fluidized bed combustor in that a spouted bed combustor is less sensitive to variations in flow rate through the gas turbine unit which occur under certain conditions of use.

If little or no water is available, an air-cooled condenser can be used. In such case, the condenser unit of the waste heat boiler preferably contains an organic fluid that is vaporized by the condensing steam for producing vaporized organic fluid, and an organic vapor turbine coupled to a generator is provided to produce power by expanding the vaporized organic fluid. The expanded vaporized organic fluid is condensed to a liquid in the air-cooled condenser; and a pump or gravitational assistance may be provided for returning the condensed liquid to the organic condenser.

When a spouted bed combustor is utilized, the power plant according to the invention preferably includes a pyrolyzer adapted to contain crushed oil shale, or other solid fuel, or mixture of fuels, and to receive ash extracted by the separator for producing a carbonaceous residue that is supplied to the spouted bed combustor, and combustible products. The combustible products in the form of combustible gases may be mechanically filtered and then pressurized before being applied to the burner of the gas turbine unit. Alternatively, the combustible products may be treated to produce clean, treated combustibles gases that are applied to the burner, and liquid fuel that may be applied to the spouted bed combustor. Finally, when a fluidized bed combustor is employed, an auxiliary heat exchanger associated with the combustor may be utilized for exchanging heat between combustor and air compressed by the compressor upstream of said burner.

If an appropriate fluidized bed combustor is used instead of a spouted bed combustor, the heat exchanger would be mounted within the combustion section. When a spouted bed combustor is used, the heat exchanger is a unit separate from the combustor.

BRIEF DESCRIPTION OF THE DRAWINGS

Embodiments of the present invention are shown by way of examples in the accompanying drawings wherein.

DETAILED DESCRIPTION

Figure 1:
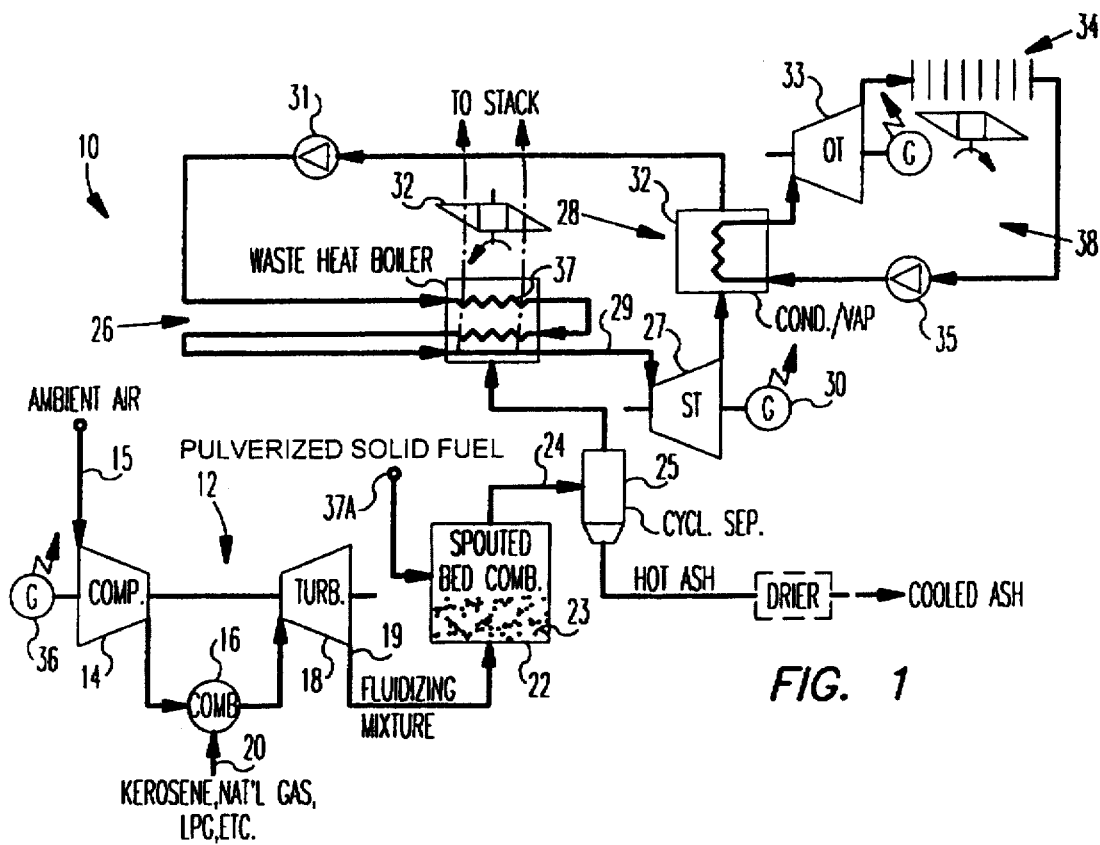
FIG. 1 is a block diagram of a power plant according to the present invention showing a gas or liquid fueled gas turbine unit that fluidizes a spouted bed combustor supplying products of combustion to a waste heat boiler.

Referring now to the drawings, reference numeral 10 designates one embodiment of a power plant according to the present invention and specifically, a multi-fuel combined cycle power plant. Plant 10 comprises gas turbine unit 12 having compressor 14 for compressing ambient air entering the compressor at 15, burner 16 for heating air compressed by the compressor, generator 36, and turbine 18 for expanding air heated by the burner to drive the compressor and generator, producing electric power and hot exhaust gases that exit the turbine at 19. Usually, external source of fuel 20 (preferably, natural gas, liquefied petroleum gas (LPG), or kerosene) is provided for supplying fuel to burner 16 of unit 12 where the fuel burns in excess air.

Plant 10 also includes a combustor, which may be a fluidized bed combustor, but preferably is a spouted bed combustor indicated by reference numeral 22, for containing particles 23 of solid fuel. A spouted bed combustor is described in *Spouted Beds* by K. B. Mathur and N. Epstein, Academic Press, 1974, which is hereby incorporated by reference. Alternatively, combustor 22 may be another type of suitable combustor.

Spouted bed combustors are presently considered advantageous for the combustion of oil shale because of the recirculation of ash and carbonaceous material which occurs in the combustor. Such recirculation ensures adequate heating of fresh oil shale supplied to the combustor so that substantially all of the organic material present in the oil shale is converted into vapor for combustion. A further advantage of a spouted bed combustor is the placement of a heat exchanger for producing, for example, steam, outside of the combustion chamber. This allows ash in the products of combustion produced by the spouted bed combustor to be removed before such products are applied to a heat exchanger thus inhibiting its fouling.

Particles 23 in combustor 22 are fluidized with the exhaust gases in line 19 connected to the exhaust of turbine 18. The particles burn in the combustor producing in outlet 24, hot products of combustion that include coarse ash particulate, fine ash, and hot flue gases. While the drawing shows the turbine exhaust gases being used to fluidize particles 23 in the spouted bed combustor, a portion of these gases also can be input to other portions of combustor 22 for improving the combustion conditions, or to waste boiler 26 for improving its performance. Alternatively, in this embodiment, and in the other embodiments of the present invention as well, a portion of the turbine exhaust gases can be used for heating an organic fluid which can be used for producing power.

Combustor 22 also includes separator 25 for extracting ash particulate from the hot products of combustion produced by the combustor; and means 26 are provided for generating power in response to the hot products of combustion. In plant 10, means 26 are in the form of waste heat boiler 26, steam turbine 27, and steam condenser unit 28. Boiler 26 is physically separate from spouted bed combustor 22 and responsive to the hot products of combustion after separator 25 extracts coarse ash particulate for producing steam that is applied via line 29 to steam turbine 27. Expansion of the steam in turbine 27 drives generator 30 and produces power. Finally, condenser unit 28 serves to condense steam expanded in the steam turbine producing steam condensate that is returned by pump 31 to the waste heat boiler. As indicated, fan 32 associated with the waste heat boiler is provided between the outlet of the waste heat boiler and the stack (not shown) for enhancing the flow of the products of combustion through heating coils 33 carrying water, and also for reducing the back pressure on the exit of the gas turbine.

Preferably, condenser unit 28 includes condenser 32 that is a part of organic Rankine cycle power module 38. Condenser 32 contains an organic fluid, preferably pentane, that is vaporized by the condensing steam for producing vaporized organic fluid, and organic vapor turbine 33 for expanding the vaporized organic fluid and producing power and expanded organic vapor. Module 38 of unit 28 includes organic vapor condenser 34, which preferably, is air cooled for condensing the expanded organic fluid to a liquid. The organic liquid condensate may be returned to condenser 32 by pump 35, or by gravity utilizing the hydraulic head of the liquid if the elevation of condenser 34 is sufficiently above condenser 34.

Hot ash separated by separator 25 from the products of combustion produced by the spouted bed combustor may be used to heat the pulverized solid fuel before it is fed to the spouted bed combustor. This optional arrangement is indicated by the block marked "drier".

When a spouted bed combustor is used in accordance with the present invention, additional air, if needed, may be supplied to the combustion chamber to increase the volumetric flow of heated air. Such heated air can be used for heating purposes such as heating compressed air using an indirect heat exchanger. Alternatively, the air can be supplied directly to the turbine of a gas turbine. Also here, when an indirect heat exchanger is used, a ceramic heat exchanger advantageously can be used. In addition, when the hot air exiting combustion chamber is used directly (i.e., without heat exchanger surfaces being utilized), ceramic filters can be employed.

While a spouted bed combustor is shown schematically in FIG. 1, a conventional fluidized bed combustor can also be used. However, the range of air flow over which a spouted bed combustor will work successfully is greater than the range of flow for a conventional fluidized bed combustor. Thus, a spouted bed combustor is more suitable when there is a wide variation in flow rates and in types of solid fuel that is utilized due, for example, to daily and/or seasonal changes. A spouted bed combustor has other advantages as described below when topping of the compressed air is employed.

In operation, ambient air is compressed in compressor 14 producing compressed air that is heated by the burning of liquid or gaseous fuel in burner 16, combustion taking place under conditions of excess air producing hot gases that expand in turbine 18 driving generator 36. The exhaust gases fluidize solid fuel particles 23 which are fed to the combustion chamber of spouted bed combustor 22 from source 37A of pulverized fuel (e.g., crushed oil shale) where the fuel burns producing hot products of combustion that include coarse particulate, fine ash, and hot gases. After the coarse particulate are separated from the products of combustion by cyclone separator 25, the remaining hot products of combustion are applied to waste heat boiler 26 containing heat transfer coils 37. Water in these coils is heated, vaporized, and superheated before being applied to steam turbine 27 wherein expansion takes place driving generator 30. Condensation takes place in condenser unit 32, and pump 31 returns the condensate to waste heat boiler 26. Finally, additional power is generated by condensing the steam in condenser unit 28 using an organic Rankine cycle power plant as described above.

Figure 2:
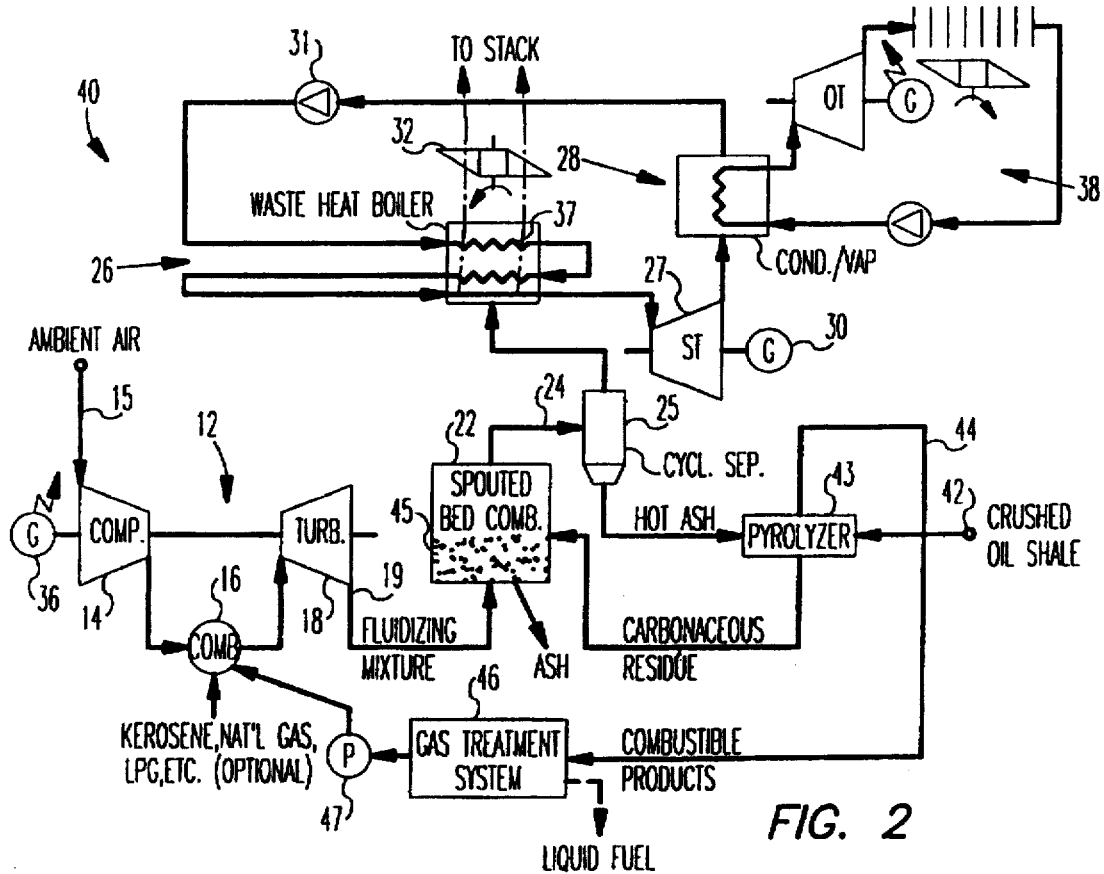
FIG. 2 is a block diagram of a power plant like that shown in FIG. 1 but incorporating a pyrolyzer for supplying combustible gas to the gas turbine unit.

In plant 10 described above, pulverized solid fuel is fed directly to spouted bed combustor 22. However, the present invention also contemplates treating pulverized solid fuel in a pyrolyzer before the fuel is fed to the spouted bed combustor as shown in plant 40 of FIG. 2. In FIGS. 1 and 2, like reference numerals are applied to like components. In plant 40 of FIG. 2, crushed oil shale from source 42 is applied to pyrolyzer 43 which also receives hot, coarse particulate from cyclone separator 25. In the oxygen free atmosphere contained within the pyrolyzer, organic material in the crushed oil shale produces combustible products that are drawn from the pyrolyzer via line 44. Carbonaceous residue 45 from the pyrolyzer is fed to spouted bed combustor 22. Ash produced by the combustion process in the spouted bed combustor is continuously removed from the combustor.

Preferably, heat contained in the combustible products produced by pyrolyzer 43 may be used to supplement the heating of the compressed air produced by compressor 14. Thus, the combustible products may be applied directly to burner 16, wherein they are burned together with preferably natural gas, or LPG, or liquid fuels, or, the combustible products first can be applied to gas treatment system 46 for the purpose of filtering or further treating the combustible products.

Gas treatment system 46 is a schematic representation of apparatus for pre-treating the combustible products of the pyrolyzer and producing a fuel. System 46 may comprise a ceramic filter which serves to extract fine particulate from the combustible products and produce fuel in the form of clean combustible gas at high temperature. Alternatively, system 46 may comprise a liquid bath, such as water or a hydrocarbon, wherein filtration of the combustible products takes place producing fuel in the form of clean combustible gas that is cooled to between 200°–300° C., and a combustible liquid.

The fuel produced by system 46 can be used in the power plant for a number of purposes. Preferably, clean combustible gas produced by system 46 is fed to burner 16; and in such case, element 47 associated with system 46, represents a compressor which pressurizes the clean combustible gas to effect its entry into burner 16. Also, combustible liquid fuel produced by system 46 can be fed to burner 16; and in this case, element 47 represents a pump. Optionally, some of combustible products produced by the pyrolyzer can be fed, unfiltered, directly to spouted bed combustor 22.

The operation of plant 40 so far as gas turbine unit 12 and waste heat boiler 26 are concerned is substantially the same as previously described in connection with plant 10. The significant different in plant 40 over plant 10 is the provision of pyrolyzer 43, and optional gas treatment system 46 for the purpose of supplementing heat added by burner 16 to air compressed by compressor 14.

Figure 3:
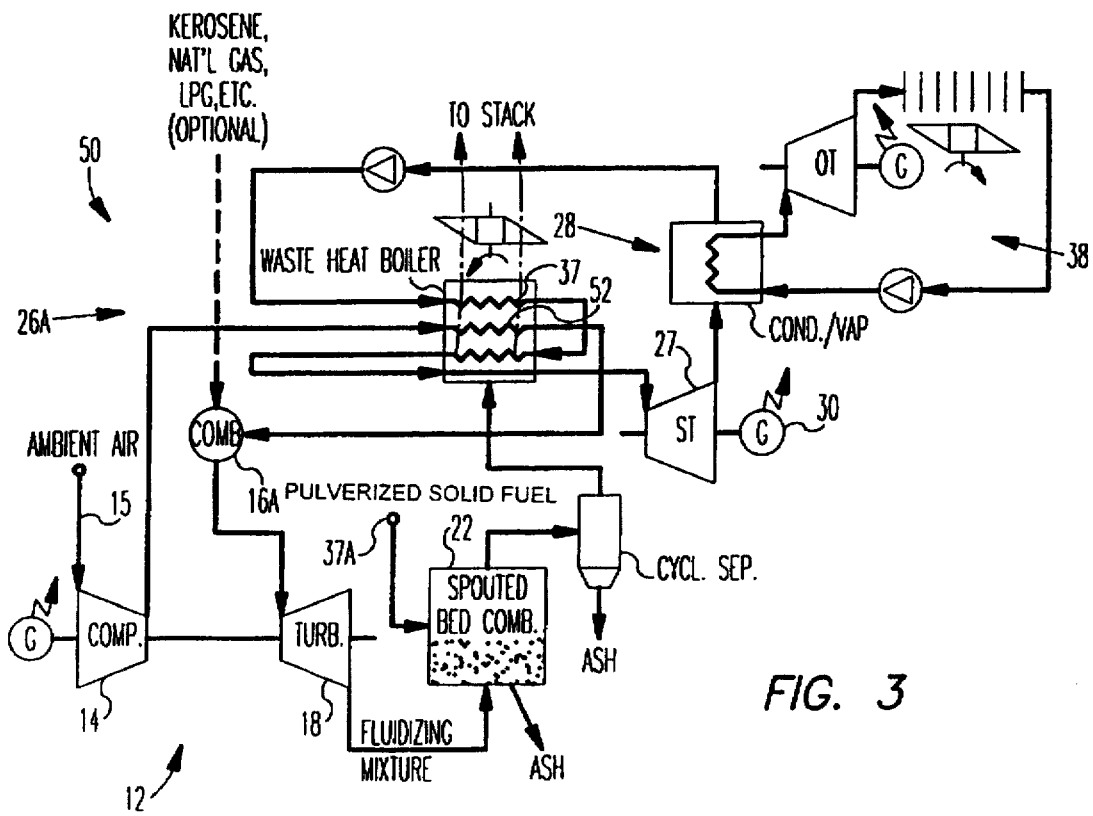
FIG. 3 is a block diagram of a power plant like that shown in FIG. 1 in which the air compressed by the compressor of the gas turbine unit is heated in a waste heat boiler, and then topped by using gaseous or liquid fuel in a separate burner.

Topping of the heat added to the compressed air in gas turbine unit 12, which is achieved in plant 40 by the combustion of the combustible products produced by the pyrolyzer, can be achieved in a plant like plant 10 in the manner shown in FIG. 3 to which reference is now made. Plant 50 shown in FIG. 3 is similar to plant 10 shown in FIG. 1 except for the topping feature to be described. Like reference numerals in FIG. 3 are applied to like components shown in FIG. 1. In FIG. 3, heating of the air compressed in compressor 14 is achieved by the provision of means for exchanging heat upstream of the burner between waste heat boiler 26A and air compressed by the compressor. Specifically, as shown in FIG. 3, waste heat boiler 26A is provided with heat exchange coils 52 through which air compressed by compressor 14 passes thereby heating the compressed air before it is applied to burner 16A. If the heat supplied to the air compressed by compressor 14 by coils 52 is not adequate, preferably natural gas, or LPG, or liquid fuels such as kerosene, etc. also may be burned in burner 16A to top the heat supplied by coils 52.

Figure 4:
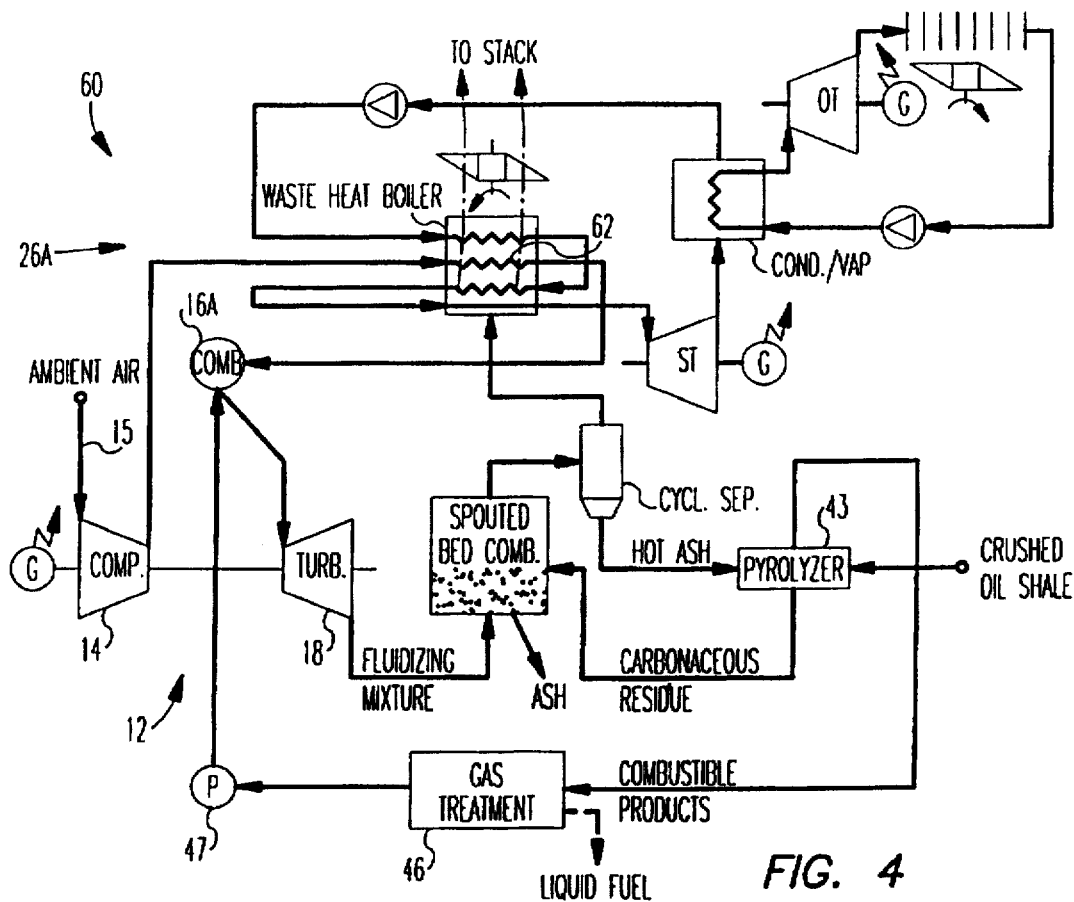
FIG. 4 is is a block diagram of a power plant like that shown in FIG. 3 but incorporating a pyrolyzer for supplying combustible gas to the gas turbine unit.

The use of gaseous or liquid fuels for heating the air compressed by the compressor of the gas turbine unit can be dispensed with in the arrangement shown in plant 60 of FIG. 4 to which reference is now made. Plant 60 is similar to plant 40 and like reference numerals in FIGS. 2 and 4 are applied to like components. In plant 60, waste heat boiler 26A is provided with heat exchange coils 62 through which air compressed by compressor 14 passes before being applied to burner 16A. Gas treatment system 26 receives the combustible products produced by pyrolyzer 43 and produces clean gaseous fuel, or a combination of clean gaseous fuel and liquid fuel as described above; and fuel may be fed to burner 16A also receives combustible products or treated combustible products produced by pyrolyzer 43. Thus, the compressed air produced by compressor 14 is heated by both heat extracted from waste heat boiler 26A and by the heat produced by the combustible products produced by the pyrolyzer. In this embodiment, no conventional gaseous or liquid fuel is necessary for the operation of the plant.

Figure 5:
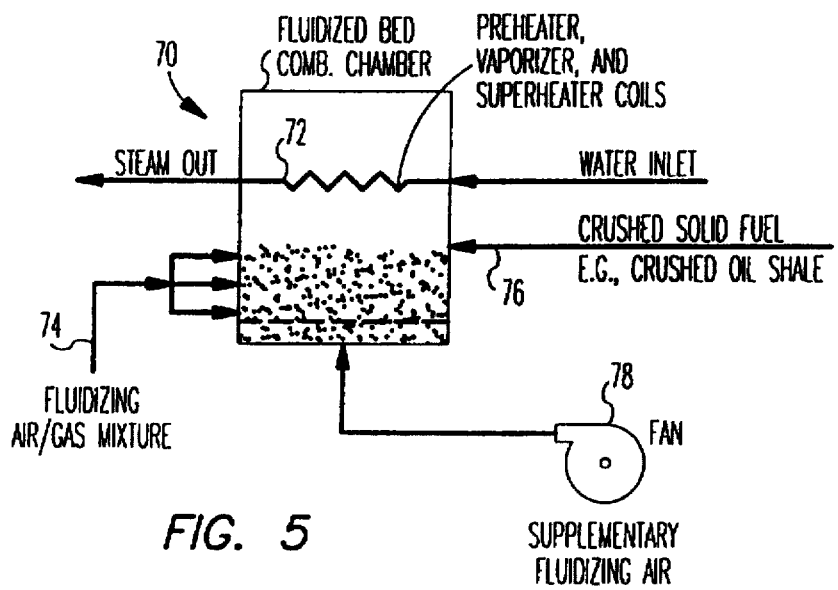
FIG. 5 is a schematic showing of a fluidized bed suitable for use in the present invention.

The above-described embodiments of the present utilize a spouted bed combustor, but a conventional fluidized bed combustor could also be used under some circumstances. This arrangement is illustrated in FIG. 5 where fluidized bed combustor 70 is illustrated having the coils 72 in the combustion chamber. These coils contain water that is converted to steam which is supplied to a steam turbine. Coils 72 are shown schematically and represent the preheating, vaporization, and super heating coils that would be associated with a fluidized bed combustor.

When a fluidized bed is used, the hot exhaust gases from the gas turbine unit are applied as indicated at 74 a purpose of fluidizing the contents of the combustion chamber. Pulverized solid fuel, such as crushed oil shale, for example, is applied to the fluidized bed from source 76, and the fluidizing operation is achieved by reason of the fluidizing air/gas mixture supplied by the exhaust of the gas turbine unit and by auxiliary fan 78 which supplies supplementary fluidizing air to the combustion chamber.

Figure 6:
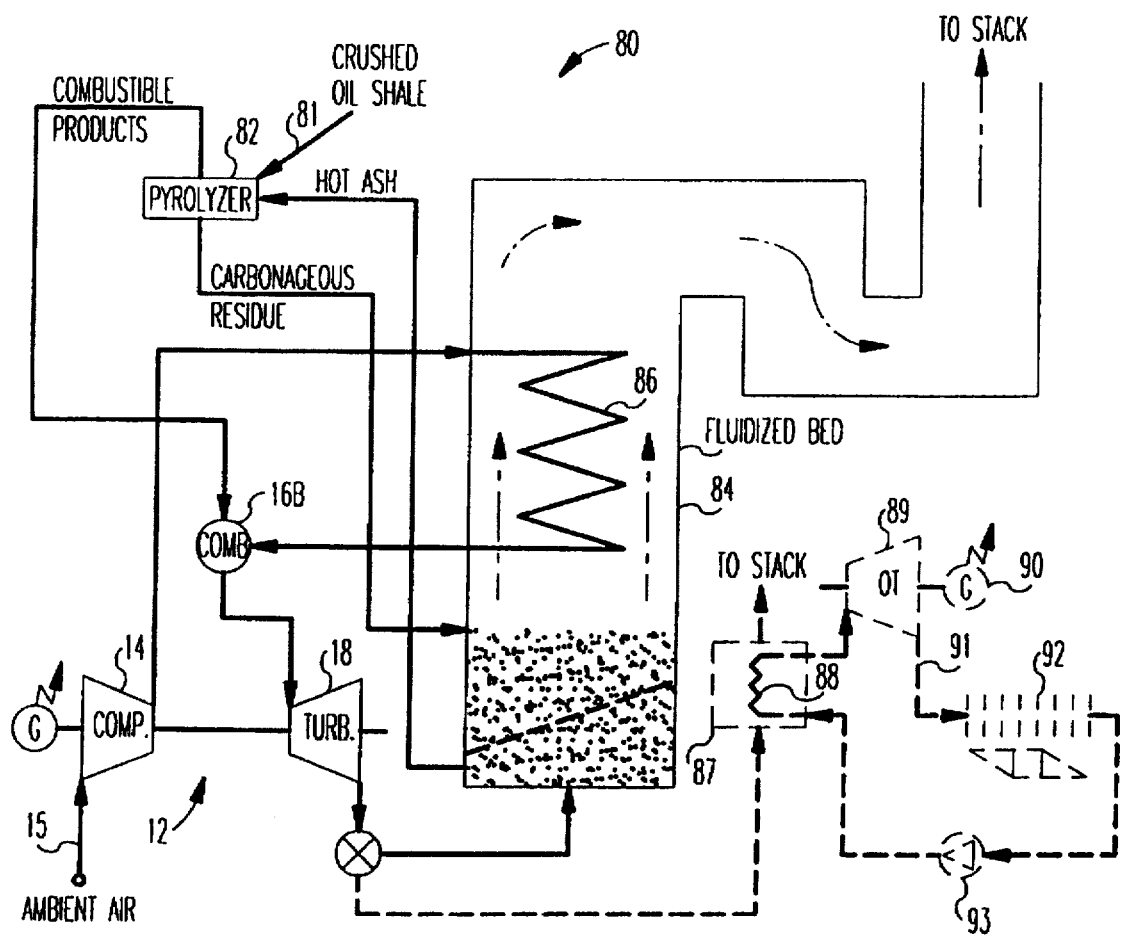
FIG. 6 is a block diagram of a power plant according to the present invention showing a conventional fluidized bed supplied with fuel from a pyrolyzer, and showing topping off of the air compressed by the compressor of the gas turbine unit using heat in the fluidized bed.

Instead of directly supplying pulverized solid fuel to the fluidized bed combustor shown in FIG. 5, a pyrolyzer may be utilized as illustrated by plant 80 in FIG. 6 to which reference is now made. As shown in FIG. 6, pyrolyzer 82 receives crushed oil shale from source 81 thereof and receives hot coarse ash particulate from fluidized bed combustor 84. The pyrolyzer produces a carbonaceous residue which is applied to the fluidized bed and also produces combustible products which may be applied directly to burner 16B associated with gas turbine units 12. Optionally, the combustible products may be treated as described above before combustion takes place in burner 16B.

Burner 16B receives air compressed by compressor 14 of gas turbine unit 12 after the air passes through heat transfer coils 86 contained within the combustion chamber of the fluidized bed. The heated air is now applied to the burner where the combustible products from pyrolyzer 82 are burned thereby heating the air applied to turbine 18. The exhaust from this turbine is applied as a fluidizing air/gas mixture to fluidized bed 84 as indicated in the solid lines in the drawing.

Optionally, as shown by the broken lines in FIG. 6 some of the exhaust gases from turbine 18 may be applied to indirect heat exchanger 87 before being exhausted to a suitable stack. Heat exchanger 87 includes heat exchange coils 88 containing an organic fluid which is vaporized by the exhaust gases from the turbine producing vaporized organic fluid which is applied to organic turbine 89 wherein expansion takes driving generator 90 and producing expanded organic vapor in line 91. The expanded organic vapor is condensed in air condenser 92 and the condensate is returned by pump 93 to coils 88 completing the organic fluid cycle.

Figure 7:
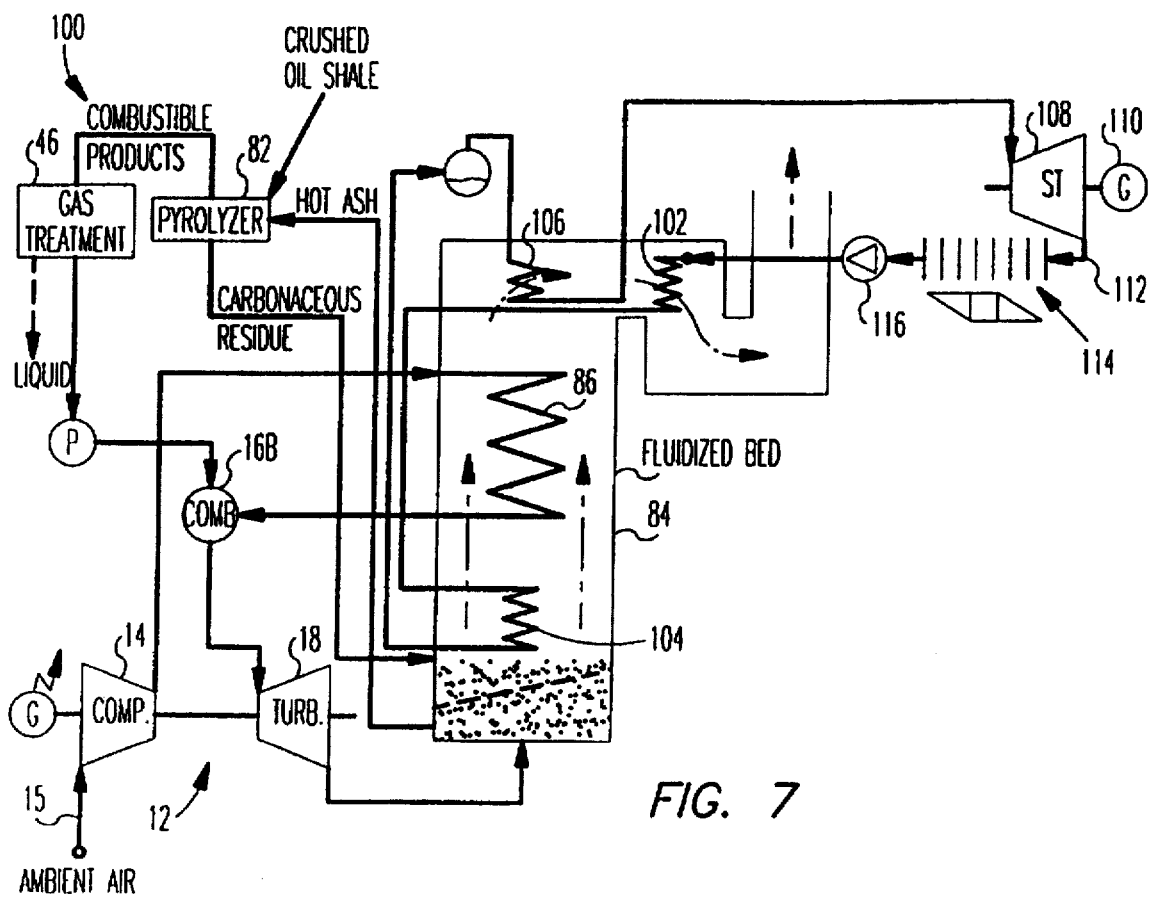
FIG. 7 is a modification of the power plant shown in FIG. 6.

Instead of generating power using an organic fluid as shown in FIG. 6, steam can be used for generating the power as illustrated in FIG. 7 to which reference is now made. Plant 100 shown in FIG. 7 is similar to the plant 80 shown in FIG. 6 and like reference numerals in each of these figures denote like components. In FIG. 7, coils 86 in the combustion chamber of fluidized bed 84 provide heat for heating the compressed air produced by compressor 14. Topping of this air may be achieved by heat produced by the combustion of combustible products produced by pyrolyzer 82 in burner 16B.

Fluidized bed 84 also includes preheater coils 102, vaporizer coils 104, and super heater coils 106 by which water is sequentially preheated, vaporized and then super heated by reason of the combustion process effected in fluidized bed 84. Super heated steam produced by super heater coils 106 is applied to steam turbine 108 where expansion takes place driving generator 110 and producing expanded steam in line 112. Air cooled condenser 114 is provided for condensing the expanded steam produced by the steam turbine and producing a condensate which is returned by pump 116 to preheater coils 112 completing the water cycle of the power plant.

In the embodiments of the invention utilizing a pyrolyzer, crushed oil shale is shown as being added to the pyrolyzer, and the carbonaceous residue from the pyrolyzer is shown as being fed to a spouted bed combustor. In a modification, crushed oil shale as well as the carbonaceous residue from the pyrolyzer can be added directly to the spouted bed combustor. Moreover, other low heat content fuels, such as peat, can be used in place of, or combined with oil shale in the various embodiments of the invention described above. In addition, such low heat content fuels can be combined with sulfur rich materials like sulfur rich fuel, e.g., high sulfur fuel oil and used together in the present invention by mixing or separately adding the fuels to the pyrolyzer, to the spouted bed combustor, or to the fluidized bed in the various embodiments.

Finally, the present invention is particularly well adapted to relatively small power plants, i.e., plants up to about 30 MW. Thus, the invention provides an efficient, cost effective, and non-polluting way to produce electricity at many location throughout the world.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed:

1. A power plant comprising:
a) a gas turbine unit having a compressor for compressing ambient air, a burner for heating air compressed by said compressor, a generator, and a turbine coupled to the generator and to the compressor for expanding air heated by said burner to drive said compressor and said generator to produce hot exhaust gases and electricity;
b) means for supplying fuel to said burner;
c) a combustor for containing particles of solid fuel;
d) means applying said exhaust gases to said combustor for fluidizing and combusting said particles in said combustor to produce hot products of combustion that include coarse ash particulate; and
e) means responsive to said hot products of combustion for generating power;
f) wherein said combustor includes a separator for extracting ash particulate from said hot products of combustion, and said means responsive to said hot products includes:
 (1) a waste heat boiler responsive to said hot products of combustion after said separator extracts coarse ash particulate for producing steam;
 (2) a steam turbine for expanding said steam and producing power;
 (3) a steam condenser unit for condensing steam expanded in said steam turbine and producing condensate; and
 (4) means for returning the condensate produced by said condenser unit to said waste heat boiler; and
g) wherein said condenser unit includes:
 (1) a condenser containing an organic fluid that is vaporized by the condensing steam;
 (2) an organic vapor turbine for expanding organic fluid vaporized in said condenser and producing power;
 (3) an organic vapor condenser for condensing organic fluid expanded by said turbine to a liquid; and
 (4) means for returning said liquid to said condenser.

2. A power plant according to claim 1 including a pyrolyzer adapted to contain crushed oil shale for receiving ash particulate extracted by said separator and producing a carbonaceous residue that is supplied to said combustor, and combustible products.

3. A power plant according to claim 2 wherein said means for supplying fuel to said burner supplies said combustible products to said to said burner.

4. A power plant according to claim 3 wherein said means for supplying fuel to said burner supplies additional fuel to said burner.

5. A power plant according to claim 3 including means for treating said combustible products before they are supplied to said burner.

6. A power plant according to claim 1 including means for exchanging heat between said waste heat boiler and air compressed by said compressor upstream of said burner.

7. A power plant according to claim 3 including means for exchanging heat between said waste heat boiler and air compressed by said compressor upstream of said burner.

8. A power plant according to claim 1 wherein said combustor is a fluidized bed combustor, and said means for fluidizing includes an auxiliary fan.

9. A power plant comprising:
a) a gas turbine unit having a compressor for compressing ambient air, a burner for heating air compressed by said compressor, a generator, and a turbine coupled to said generator and to said compressor for expanding air heated by said burner to drive said compressor and generator to produce hot exhaust gases and electricity;
b) means for supplying fuel to said burner;
c) a combustor for containing particles of solid fuel;
d) means applying said exhaust gases to said combustor for fluidizing and combusting said particles in said combustor to produce hot products of combustion that include coarse ash particulate; and e) means responsive to said hot products of combustion for generating power, said last named means including a waste heat boiler separate from said combustor for generating steam, a steam turbine response to said steam for generating power and heat depleted steam, a condenser for condensing said heat depleted steam to condensate, and means for returning said condensate to said waste heat boiler;

f) wherein said combustor is a fluidized bed combustor that produces hot ash residue, and said power plant includes a pyrolyzer adapted to contain crushed oil shale for receiving ash from said bed and producing a carbonaceous residue that is supplied to said fluidized bed and combustible products that are supplied to said burner.

10. A power plant according to claim 9 including means for exchanging heat between said fluidized bed and air compressed by said compressor upstream of said burner.

11. A power plant according to claim 10 including:

a) a heat exchanger for receiving a portion of said exhaust gases and containing an organic fluid that is vaporized by said last mentioned exhaust gases for producing vaporized organic fluid;

b) an organic vapor turbine for expanding said vaporized organic fluid and producing power and expanded organic vapor;

c) an organic vapor condenser for condensing said expanded organic fluid to a liquid; and d) means for returning said liquid to said heat exchanger.

12. A power plant according to claim 10 including:

a) heat exchange elements associated with said fluidized bed for producing steam;

b) a steam turbine for expanding said steam and producing power and expanded steam;

c) a steam condenser for condensing said expanded steam to a liquid; and d) means for returning said liquid to said heat exchange elements.

13. A method for generating power from a gas turbine unit having a compressor for compressing ambient air, a burner for heating air compressed by said compressor, and a turbine for expanding air heated by said burner to drive said compressor and produce hot exhaust gases, and from a waste heat boiler heated by, but separate from, a combustor containing particles of solid fuel that are fluidized by said exhaust gases, said method including operating said combustor as a fluidized bed combustor that produces hot ash residue, and pyrolyzing oil shale using said hot ash residue for producing a carbonaceous residue that is supplied to said combustor, and combustible products that are supplied to said burner.

14. A method according to claim 13 including applying hot products of combustion produced by said combustor to a waste heat boiler separate from said combustor, and applying steam produced by said waste heat boiler to a steam turbine that drives a generator.

15. A method according to claim 14 including preheating air compressed by said compressor before such air is heated by said burner, said preheating being effected by heat from said waste heat boiler.

16. A method according to claim 14 including rejecting heat from said steam turbine to an organic fluid which is vaporized as a result, and using heat in the vaporized organic fluid to generate power.

17. A power plant according to claim 1 wherein said combustor is a spouted bed combustor.

18. A power plant comprising:

a) a gas turbine unit having a compressor for compressing ambient air, a burner for heating air compressed by said compressor, a generator, and a turbine coupled to the generator and to the compressor for expanding air heated by said burner to drive said compressor and said generator to produce hot exhaust gases and electricity;

b) means for supplying fuel to said burner;

c) a combustor for containing particles of solid fuel;

d) means applying said exhaust gases to said combustor for fluidizing and combusting said particles in said combustor to produce hot products of combustion that include coarse ash particulate; and e) means responsive to said hot products of combustion for generating power;

f) wherein said combustor includes a separator for extracting ash particulate from said hot products of combustion, and said means responsive to said hot products includes:

(1) a waste heat boiler responsive to said hot products of combustion after said separator extracts coarse ash particulate for producing steam;

(2) a steam turbine for expanding said steam and producing power;

(3) a steam condenser unit for condensing steam expanded in said steam turbine and producing condensate; and (4) means for returning the condensate produced by said condenser unit to said waste heat boiler; and g) means for supplying oil shale and sulfur rich fuel to said combustor.

19. Apparatus according to claim 18 including means upstream of said burner for exchanging heat between said waste heat boiler and air compressed by said compressor.

20. A power plant according to claim 18 wherein said combustor is a fluidized bed combustor that produces hot ash residue, and said power plant includes a pyrolyzer to which said oil shale and sulfur rich fuel is supplied for producing a carbonaceous residue and combustible products, means for supplying said pyrolyzer with ash from said fluidized bed, means for supplying said carbonaceous residue to said fluidized bed, and means for supplying said combustible products to said burner.

* * * * *